US011907327B2

(12) United States Patent
Yamakura

(10) Patent No.: US 11,907,327 B2
(45) Date of Patent: Feb. 20, 2024

(54) ARITHMETIC METHOD

(71) Applicant: SOCIONEXT INC., Kanagawa (JP)

(72) Inventor: Makoto Yamakura, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 664 days.

(21) Appl. No.: 17/108,833

(22) Filed: Dec. 1, 2020

(65) Prior Publication Data

US 2021/0081489 A1 Mar. 18, 2021

Related U.S. Application Data

(63) Continuation of application No. PCT/JP2018/021371, filed on Jun. 4, 2018.

(51) Int. Cl.
*G06F 17/15* (2006.01)
*G06F 17/16* (2006.01)
*G06N 3/04* (2023.01)

(52) U.S. Cl.
CPC .............. *G06F 17/15* (2013.01); *G06F 17/16* (2013.01); *G06N 3/04* (2013.01)

(58) Field of Classification Search
CPC ........ G06F 17/15; G06F 17/153; G06F 17/16; G06F 12/00; G06F 12/02; G06F 12/06; G06N 3/04; G06N 3/063
See application file for complete search history.

(56) References Cited

U.S. PATENT DOCUMENTS

2018/0157968 A1 6/2018 Henry et al.
2018/0285726 A1* 10/2018 Baum .................... G06F 17/10

FOREIGN PATENT DOCUMENTS

JP 2002-269067 A 9/2002
JP 2007-206887 A 8/2007
JP 6250782 B1 12/2017

OTHER PUBLICATIONS

M. Peeman et al., Memory-Centric Accelerator Design for Convolutional Neural Networks, IEEE 2013 (Year: 2013).*
International Search Report and Written Opinion dated Aug. 21, 2018 in International Patent Application No. PCT/JP2018/021371; with partial English translation.
Kalin Ovtcharov, et al., "Accelerating Deep Convolutional Neural Networks Using Specialized Hardware, "Microsoft Research, Feb. 22, 2015.

* cited by examiner

*Primary Examiner* — Emily E Larocque
(74) *Attorney, Agent, or Firm* — Rimon, P.C.

(57) ABSTRACT

Provided is an arithmetic method of performing convolution operation in convolutional layers of a neutral network by calculating matrix products. The arithmetic method includes: determining, for each of the convolutional layers, whether an amount of input data to be inputted to the convolutional layer is smaller than or equal to a predetermined amount of data; selecting a first arithmetic mode and performing convolution operation in the first arithmetic mode, when the amount of input data is determined to be smaller than or equal to the predetermined amount of data in the determining; selecting a second arithmetic mode and performing convolution operation in the second arithmetic mode, when the amount of input data is determined to be larger than the predetermined amount of data in the determining; and outputting output data which is a result obtained by performing convolution operation.

7 Claims, 13 Drawing Sheets

Raster form

Tile form

ARITHMETIC METHOD

CROSS REFERENCE TO RELATED APPLICATION

This is a continuation application of PCT Patent Application No. PCT/JP2018/021371 filed on Jun. 4, 2018, designating the United States of America, The entire disclosure of the above-identified application, including the specification, drawings and claims is incorporated herein by reference in its entirety.

FIELD

The present disclosure relates to an arithmetic method, particularly to an arithmetic method for performing convolution operation in a convolutional layer of a convolutional neural network.

BACKGROUND

In recent years, image recognition can be performed using a convolutional neural network including a multilayer neural network that repeatedly performs convolution on a local area.

Moreover, it is known that a large scale integration (LSI) chip capable of performing arithmetic processing on multidimensional data can be used to perform convolution operation in a convolutional layer of a convolutional neural network (for example, see Patent Literature (PTL) 1). PTL 1 discloses a technique capable of efficiently performing arithmetic processing on 2-dimensional data having a size larger than the memory size of a memory circuit block included in the LSI chip.

CITATION LIST

Patent Literature

PTL 1: Japanese Unexamined Patent Application Publication No. 2007-206887

SUMMARY

Technical Problem

The recognition rate of image recognition using a convolutional neural network has been improved due to the recent advance in deep learning, but meanwhile, the network size has become enormous. Accordingly, a computational amount per convolutional layer has increased.

However, in PTL 1, a target for arithmetic processing is convolution operation in a relatively small convolutional neural network. Accordingly, the technique disclosed in PTL 1 has a problem that when the convolution operation is applied to a large convolutional neural network, power consumption increases since input data has to be read from external memory and used.

In other words, the LSI chip disclosed in PTL 1 has no other choice but to output, to external memory, the processing result exceeding the size of internal memory included in the LSI chip. Then, in the next convolutional layer, the processing result stored in the external memory is to be read into the internal memory and used as input data again, and thus the power consumption increases. On the other hand, in the LSI chip, when the capacity of the internal memory for temporarily storing the arithmetic processing result is increased to reduce the power consumption, the increase in capacity leads to increase in cost.

The present disclosure has been conceived in view of the above. The object of the present disclosure is to provide an arithmetic method capable of performing convolution operation while reducing power consumption even when internal memory has a limited capacity of a few M bytes or less, for example.

Solution to Problem

An arithmetic method according to the present disclosure is an arithmetic method of performing convolution operation in convolutional layers of a neural network by calculating matrix products, using an arithmetic unit and an internal memory included in a LSI. The arithmetic method includes: determining, for each of the convolutional layers, whether an amount of input data to be inputted to the convolutional layer is smaller than or equal to a predetermined amount of data; selecting a first arithmetic mode and performing convolution operation in the first arithmetic mode, when the amount of input data is determined to be smaller than or equal to the predetermined amount of data in the determining; selecting a second arithmetic mode and performing convolution operation in the second arithmetic mode, when the amount of input data is determined to be larger than the predetermined amount of data in the determining; and outputting output data which is a result obtained by performing convolution operation, in which the performing of convolution operation in the first arithmetic mode includes: storing weight data for the convolutional layer in external memory located outside the LSI; storing the input data for the convolutional layer in the internal memory; and reading the weight data from the external memory into the internal memory part by part as first data of at least one row vector or column vector, and causing the arithmetic unit to calculate a matrix product of the first data and a matrix of the input data stored in the internal memory, the weight data is read, as a whole, from the external memory into the internal memory only once, the performing of convolution operation in the second arithmetic mode includes: storing the input data for the convolutional layer in the external memory located outside the LSI; storing a matrix of the weight data for the convolutional layer in the internal memory; and reading the input data from the external memory into the internal memory part by part as second data of at least one column vector or row vector, and causing the arithmetic unit to calculate a matrix product of the second data and the matrix of the weight data stored in the internal memory, and the input data is read, as a whole, from the external memory into the internal memory only once.

With this, it is possible to perform convolution operation while reducing power consumption even when the internal memory has a limited capacity.

Here, for example, in the outputting, the output data may be outputted by storing the output data in the internal memory or the external memory as input data for a next layer following the convolutional layer.

Moreover, for example, the next layer may be a convolutional layer, a pooling layer, or a normalize layer.

Moreover, for example, the performing of convolution operation in the first arithmetic mode may include converting the input data stored in the internal memory into the matrix of the input data using sampling, and the performing of convolution operation in the second arithmetic mode may include converting the input data partially read into the internal memory into the data of at least one column vector or row vector using sampling.

Moreover, for example, in the performing of convolution operation in the second arithmetic mode, the input data may be stored in the external memory in tile form.

Moreover, for example, in the outputting, when the output data is stored in the external memory, the output data may be stored in the external memory in tile form.

An arithmetic method according to the present disclosure is an arithmetic method of performing convolution operation in convolutional layers of a neural network by calculating matrix products, using an arithmetic unit and an internal memory included in a LSI. The arithmetic method includes: determining, for each of the convolutional layers, whether an amount of input data to be inputted to the convolutional layer is smaller than or equal to a predetermined amount of data; selecting a first arithmetic mode and performing convolution operation in the first arithmetic mode, when the amount of input data is determined to be smaller than or equal to the predetermined amount of data in the determining; selecting a second arithmetic mode and performing convolution operation in the second arithmetic mode, when the amount of input data is determined to be larger than the predetermined amount of data in the determining; and outputting output data which is a result obtained by performing convolution operation, in which the performing of convolution operation in the first arithmetic mode includes: storing weight data for the convolutional layer in external memory located outside the LSI; storing the input data for the convolutional layer in the internal memory; and reading the weight data from the external memory into the internal memory part by part as first data of at least one row vector or column vector, and causing the arithmetic unit to calculate a matrix product of the first data and a matrix of the input data stored in the internal memory, the weight data is read, as a whole, from the external memory into the internal memory only once, the performing of convolution operation in the second arithmetic mode includes: storing the input data and the weight data for the convolutional layer in the external memory located outside the LSI; storing a part of the weight data from the external memory to the internal memory as first vector data which is data of at least one row vector or column vector; reading the input data from the external memory into the internal memory part by part as second data of at least one column vector or row vector, and causing the arithmetic unit to calculate a matrix product of the second data and the first vector data stored in the internal memory; storing another part of the weight data from the external memory to the internal memory as second vector data which is data of at least one row vector or column vector, the another part of the weight data being different from the part of the weight data; and reading the input data from the external memory into the internal memory part by part as third data of at least one column vector or row vector, and causing the arithmetic unit to calculate a matrix product of the third data and the second vector data stored in the internal memory, and the weight data is read, as a whole, from the external memory into the internal memory only once.

It should be noted that these general or specific embodiments may be implemented as a system, a method, an integrated circuit, a computer program, a storage medium such as a computer-readable CD-ROM, or any selective combination thereof.

Advantageous Effects

With the arithmetic method according to the present disclosure, it is possible to perform convolution operation while reducing power consumption even when internal memory has a limited capacity.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Hereinafter, the embodiment of the present disclosure will be described in detail with reference to the drawings. It should be noted that the embodiment described below shows a specific example of the present disclosure. The numerical values, shapes, materials, structural components, the arrangement and connection of the structural components, usage procedures, communication procedures, etc, shown in the following embodiment are mere examples, and thus are not intended to limit the present disclosure. Of the structural components described in the following embodiment, structural components not recited in any one of the independent claims that indicate the broadest concepts of the present disclosure will be described as optional structural components. Moreover, the figures are schematic illustrations and not necessarily precise illustrations. In the figures, substantially identical components are assigned the same reference signs, and overlapping descriptions thereof may be omitted or simplified.

Embodiment

The following describes an arithmetic method according to an embodiment with reference to the drawings.

[Configuration of System]

Figure 1:
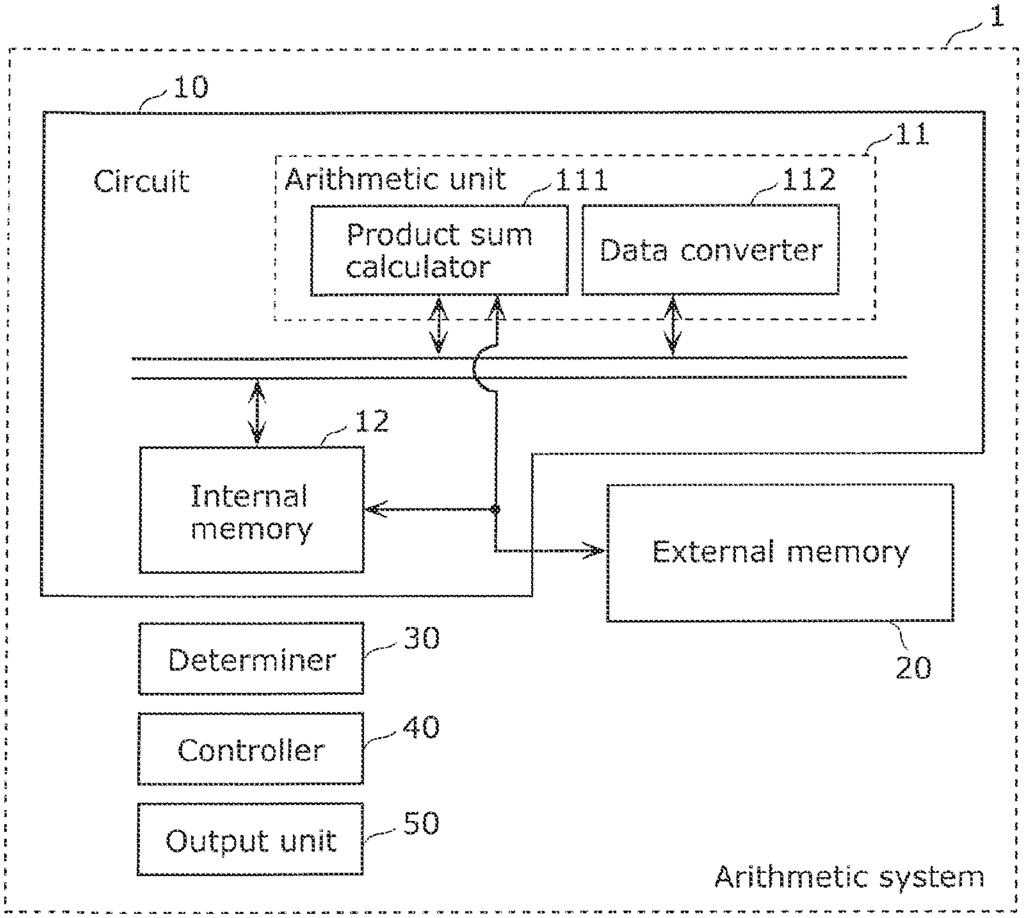
FIG. 1 is a block diagram illustrating an example of the configuration of an arithmetic system according to an embodiment.

FIG. 1 is a block diagrams illustrating an example of the configuration of arithmetic system 1 according to the embodiment.

Figure 2:
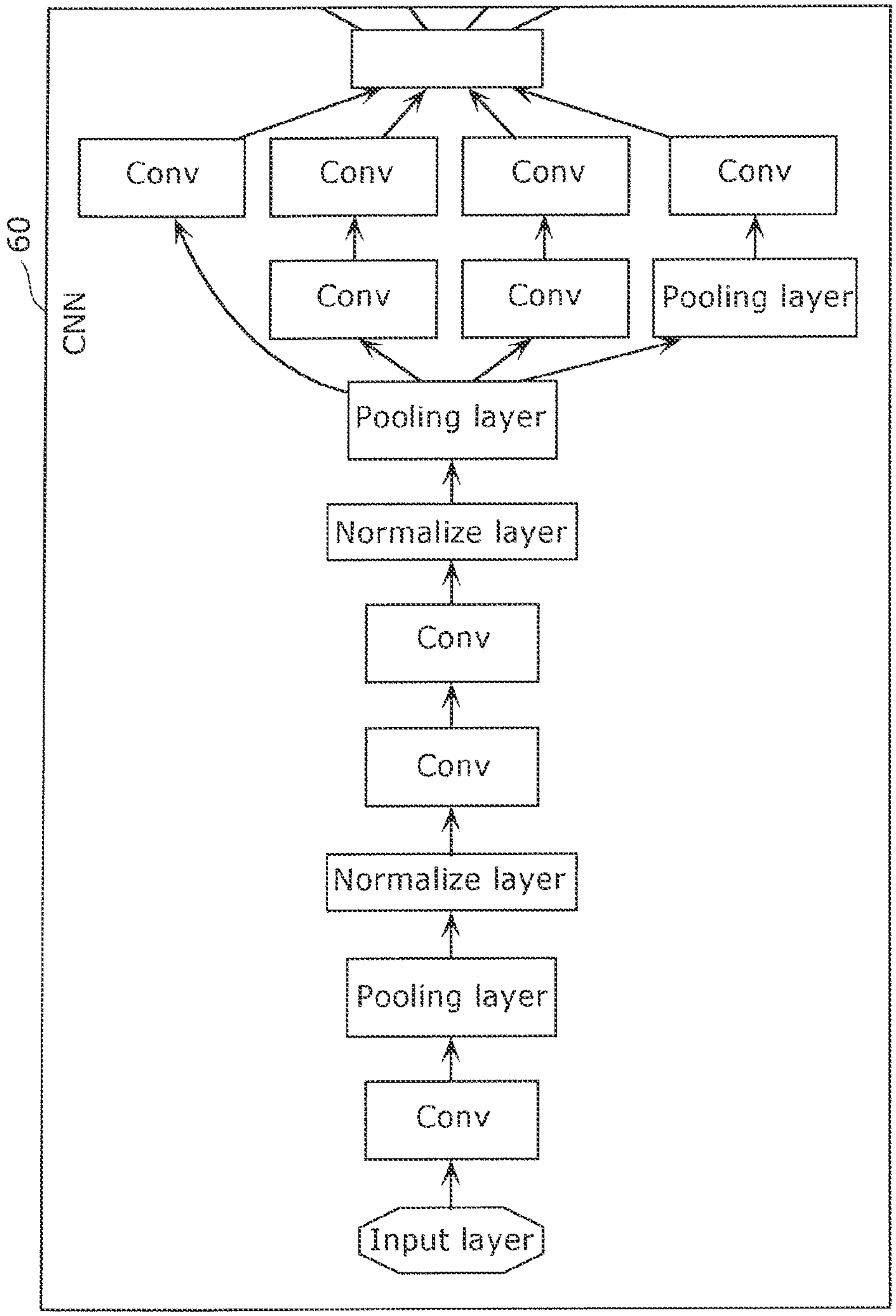
FIG. 2 is a diagram illustrating an example of the structure of a convolutional neural network according to the embodiment.

Arithmetic system 1 shown in FIG. 1 includes circuit 10, external memory 20, determiner 30, controller 40, and output unit 50. FIG. 2 is a diagram illustrating an example of the structure of convolutional neural network 60 according to the embodiment.

[External Memory 20]

External memory 20 is located outside circuit 10, and is implemented by non-volatile memory such as EEPROM or flash memory, a hard disk, RAM with a battery, etc. In the present embodiment, for example, external memory 20 stores weight data or input data for a current convolutional layer to be processed in convolutional neural network 60 based on whether the mode selected by controller 40 is the first arithmetic mode or the second arithmetic mode. External memory 20 may also store output data obtained by causing circuit 10 to perform convolution operation.

Here, an example of the structure of convolutional neural network 60 is described with reference to FIG.2. In FIG. 2, the convolutional neural network is denoted by CNN.

[Convolutional Neural Network 60]

Convolutional neural network 60 is a multilayer neural network in which a convolutional layer (Conv), a pooling layer (Pooling Layer), and a normalize layer (Normalize Layer) are repeated. In the example shown in FIG. 2, convolutional neural network 60 includes three different convolutional layers connected to the second pooling layer as the next layers following the second pooling layer.

In the present embodiment, for example, convolution operation in convolutional layers included in convolutional neural network 60 is performed by circuit 10.

[Circuit 10]

Circuit 10 is implemented by a LSI, a LSI chip, etc., and performs the convolution operation in each convolutional layer in convolutional neural network 60 by calculating a matrix product, for example. As shown in FIG. 1, circuit 10 includes arithmetic unit 11, and internal memory 12.

<Internal Memory 12>

Internal memory 12 has a relatively small capacity, and is implemented by a RAM, etc. Here, as an example of the relatively small capacity, a capacity ranging from a few hundred k bytes to a few M bytes is possible. In the present embodiment, internal memory 12 is controlled by controller 40 described below. For example, internal memory 12 stores weight data for a current convolutional layer to be processed in convolutional neural network 60 part by part or at once based on whether the mode selected by controller 40 is the first arithmetic mode or the second arithmetic mode. For example, internal memory 12 also stores input data for a current convolutional layer to be processed in convolutional neural network 60 part by part or at once based on whether the mode selected by controller 40 is the first arithmetic mode or the second arithmetic mode.

It should be noted that internal memory 12 may also store output data obtained by causing circuit 10 to perform convolution operation.

<Arithmetic Unit 11>

Arithmetic unit 11 is controlled by controller 40 described below. As shown in FIG. 1, arithmetic unit 11 includes product sum calculator 111 and data converter 112.

<<Product Sum Calculator 111>>

Product sum calculator 111 is controlled by controller 40, and performs convolution operation by calculating a matrix product.

Figure 3A:
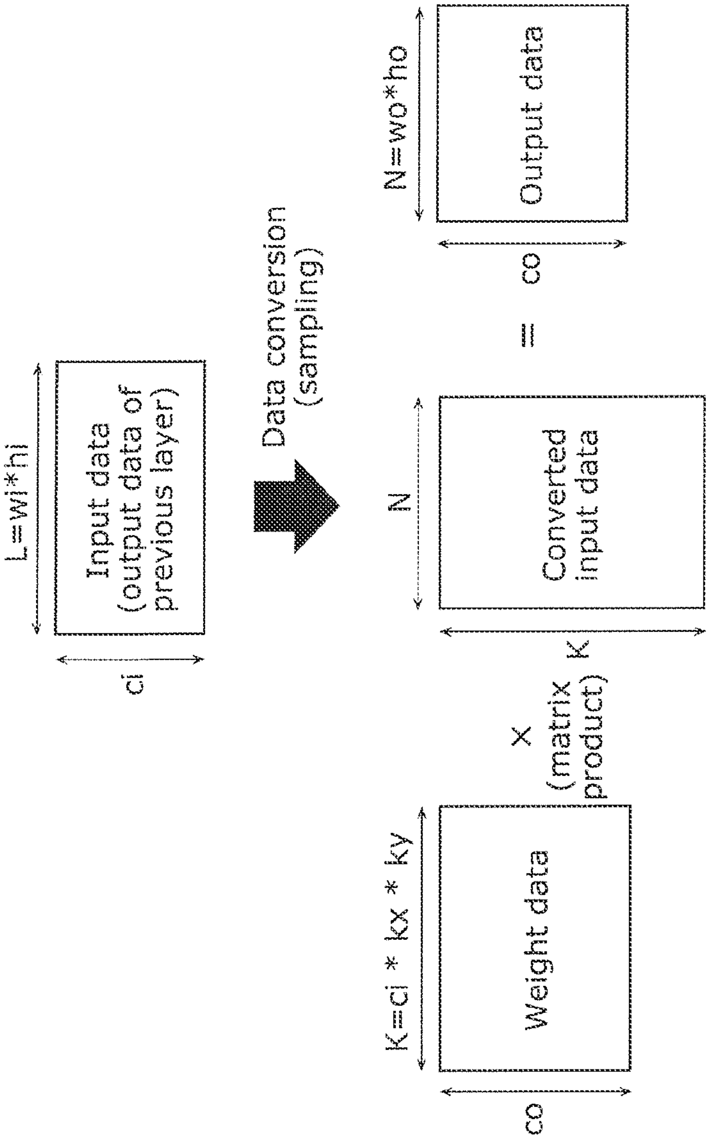
FIG. 3A is a diagram for explaining how to perform convolution operation by calculating a matrix product.
Figure 3B:
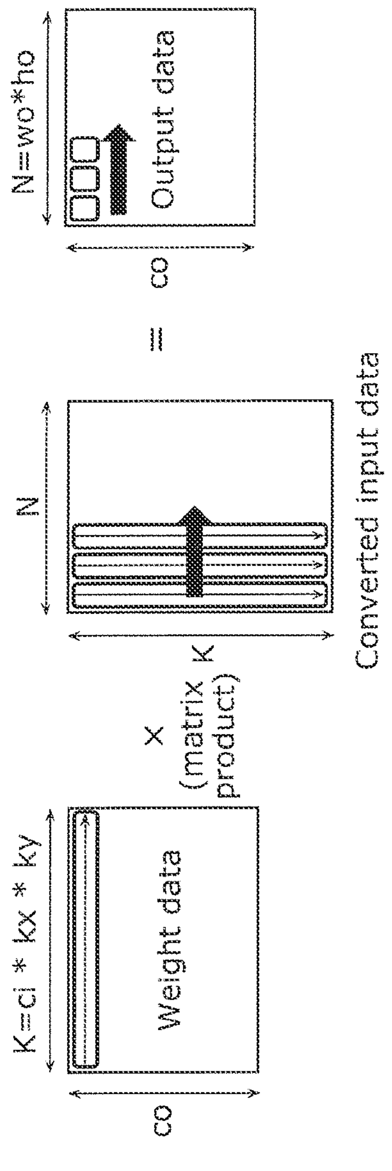
FIG. 3B is a diagram for explaining how to perform convolution operation by calculating a matrix product.

Here, how to perform convolution operation by calculating a matrix product is described with reference to FIG. 3A and FIG. 3B. FIG. 3A and FIG. 3B are each a diagram for explaining how to perform convolution operation by calculating a matrix product according to the embodiment.

It is known that performing the convolution operation of weight data and input data corresponds to calculating the matrix product of weight data and input data. Here, for example, as shown in FIG. 3A, it is assumed that the weight data is denoted by $Co \times K$ matrix, and the input data is denoted by $Ci \times L$ matrix. In this case, for example, data conversion such as sampling is performed on the input data, and using the converted input data denoted by $K \times N$ matrix, the matrix product of the weight data and the converted input data is calculated. This is because the product of $p \times q$ matrix and $r \times s$ matrix, i.e., the matrix product, is defined only when $q=r$. Then, the calculation result is $p \times s$ matrix. Accordingly, output data, which is the calculated matrix product of the weight data and the converted input data, is denoted by $Co \times N$ matrix.

For example, FIG. 3B more specifically shows how to calculate the matrix product of the weight data and the input data. In other words, the product sum of elements in the first row of the weight data and elements in the first column of the converted input data becomes an element at the first row and first column of the output data, and the product sum of elements in the first row of the weight data and elements in the second column of the converted input data becomes an element at the first row and second column of the output data. As described above, the matrix product is calculated so that the product sum of elements in a-th row of the weight data and elements in b-th column of the converted input data becomes an element at a-th row and b-th column of the output data.

It should be noted that when the convolution operation is performed by calculating a matrix product, bias data may be further added to each element of the output data.

Moreover, in FIG. 3A and FIG. 3B, the matrix product of the weight data matrix and the converted input data matrix is calculated in the stated order, but the calculation order is not limited to this. The matrix product of the converted input data matrix and the weight data matrix may be calculated in this order. In this case, it is sufficient that data conversion is performed by sampling the input data so that the number of elements in a row of the converted input data matrix is equal to the number of elements in a column of the weight data matrix.

In the present embodiment, when the first arithmetic mode is selected, product sum calculator 111 calculates the matrix product of (i) the weight data read from external memory 20 into internal memory 12 part by part as data of at least one row vector or column vector, and (ii) the input data matrix stored in internal memory 12. When the second arithmetic mode is selected, product sum calculator 111 calculates the matrix product of (i) the weight data matrix stored in internal memory 12, and (ii) the input data read from external memory 20 into internal memory 12 part by part as data of at least one column vector or row vector.

<<Data Converter 112>>

Data converter 112 is controlled by controller 40, and performs data conversion on the input data partially read into internal memory 12 or the input data stored in internal memory 12 using sampling. With this, the converted input data can be used to calculate the matrix product of the weight data matrix and the converted input data.

In the present embodiment, when the first arithmetic mode is selected, data converter 112 converts the input data stored in internal memory 12 into the input data matrix using sampling. When the second arithmetic mode is selected, data converter 112 converts the input data partially read into internal memory 12 into the data of at least one column vector or row vector using sampling.

[Determiner 30]

Determiner 30 is implemented by a Central Processing Unit (CPU, not shown), memory, etc. Determiner 30 determines, for each of convolutional layers, whether the amount of input data inputted to the convolutional layer is smaller than or equal to the predetermined amount of data. Here, for example, the predetermined amount of data refers to the maximum capacity (size) of internal memory 12 which is allocated to the input data.

In the present embodiment, for example, determiner 30 determines, for every current convolutional layer to be processed in convolutional neural network 60 shown in FIG. 2, whether the amount of input data inputted to the convolutional layer is smaller than or equal to the predetermined amount of data. It should be noted that as shown in FIG. 2, when multiple convolutional layers are connected to the same layer as the next layers, it is sufficient that determiner 30 determines whether the amount of input data inputted to each of the convolutional layers is smaller than or equal to the predetermined amount of data.

[Controller 40]

Controller 40 is implemented by a CPU (not shown), memory, etc. When determiner 30 determines that the amount of input data is smaller than or equal to the predetermined amount of data, controller 40 selects the first arithmetic mode and performs convolution operation in the first arithmetic mode. More specifically, when the first arithmetic mode is selected, controller 40 stores weight data for a current convolutional layer in external memory 20 located outside circuit 10, and input data for a current convolutional layer in internal memory 12. Then, controller 40 reads the weight data from external memory 20 into internal memory 12 part by part as data of at least one row vector or column vector, and causes product sum calculator 111 to calculate the matrix product of the data of at least one row vector or column vector and the input data matrix stored in internal memory 12. With this, the weight data is read, as a whole, from external memory 20 into internal memory 12 only once.

On the other hand, when determiner 30 determines that the amount of input data is larger than the predetermined amount of data, controller 40 selects the second arithmetic mode and performs convolution operation in the second arithmetic mode. More specifically, when the second arithmetic mode is selected, controller 40 stores input data for a current convolutional layer in external memory 20 located outside circuit 10, and a weight data matrix for a current convolutional layer in internal memory 12. Then, controller 40 reads the input data from external memory 20 into internal memory 12 part by part as data of at least one column vector or row vector, and causes product sum calculator 111 to calculate the matrix product of the data of at least one column vector or row vector and the weight data matrix stored in internal memory 12. With this, the input data is read, as a whole, from external memory 20 into internal memory 12 only once,

[Output Unit 50]

Output unit 50 outputs output data which is a result obtained by performing convolution operation. In the present embodiment, output unit 50 may output the output data by storing the output data in internal memory 12 or external memory 20 as input data for the next layer following the current convolutional layer. Here, the next layer is a convolutional layer, a pooling layer, or a normalize layer in the convolutional neural network.

Figure 4A:
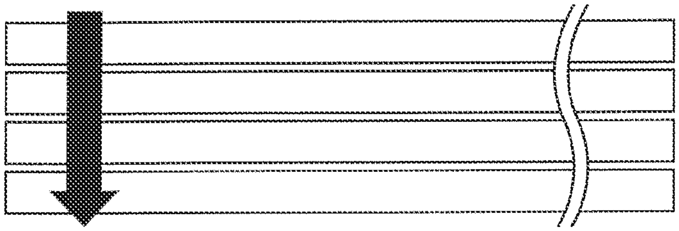
FIG. 4A is a diagram illustrating how to store output data in external memory according to the embodiment.
Figure 4B:
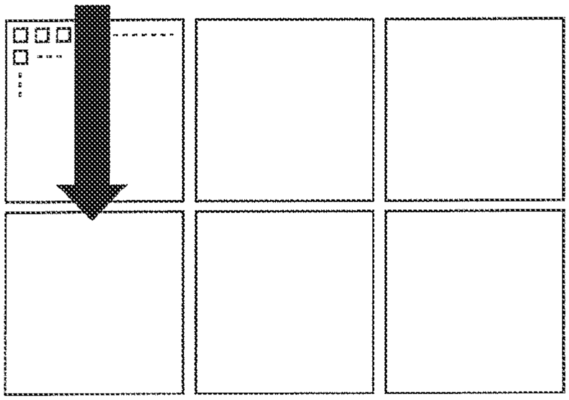
FIG. 4B is a diagram illustrating how to store output data in external memory according to the embodiment.

FIG. 4A and FIG. 4B are each a diagram illustrating how to store output data in external memory 20 according to the embodiment.

When output data is outputted to external memory 20, output unit 50 may store the output data in raster form as shown in FIG. 4A, but the output data may be stored in tile form. Here, the raster form refers to a form in which values (elements) of the output data are arranged in rows in a predetermined region. In contrast, the tile form refers to a form in which rectangular areas each having the same rectangular or square shape are arranged in a matrix in a predetermined region, and in each of the rectangular areas, values (elements) of the output data are arranged in rows.

It should be noted that the same is true of the case where the input data is stored in external memory 20. In other words, the input data may be stored in external memory 20 in the raster form or in the tile form.

When output unit 50 stores the output data and the input data in external memory 20 in the tile form, the vertical efficiency in access when the matrix product is calculated is improved in comparison with the raster form, and thus it is possible to reduce the power consumption.

[Operation of Arithmetic System 1]

The operation of arithmetic system 1 as described above will be described.

Figure 5:
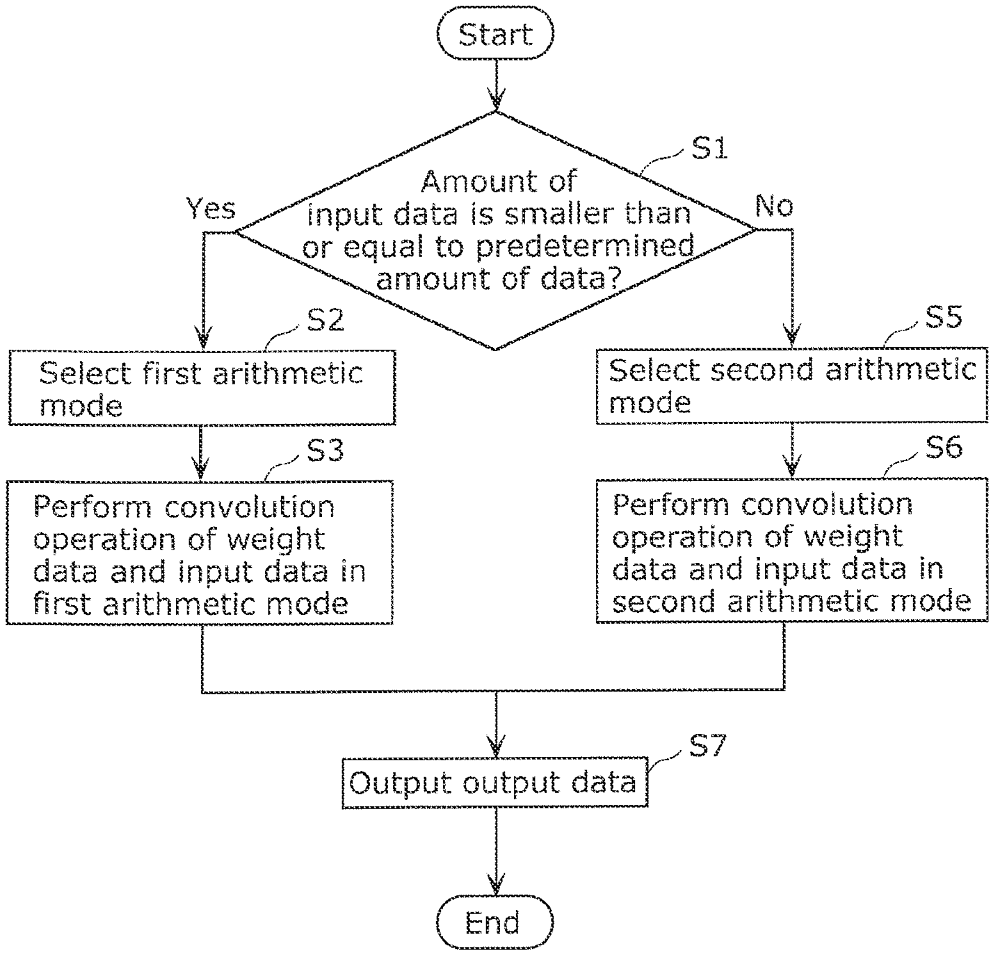
FIG. 5 is a flow chart illustrating an outline of the operation of the arithmetic system according to the embodiment.
Figure 6:
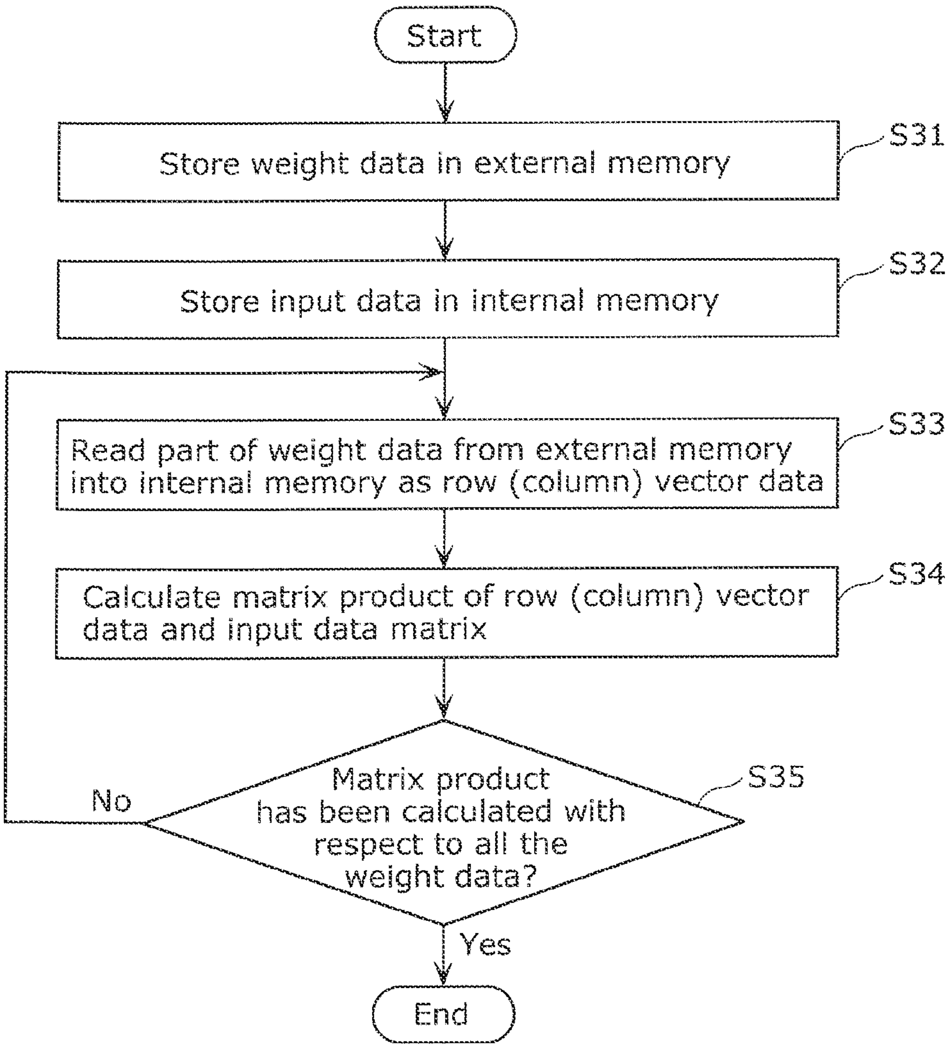
FIG. 6 is a flow chart illustrating details of the operation at step S3 shown in FIG. 5.
Figure 7:
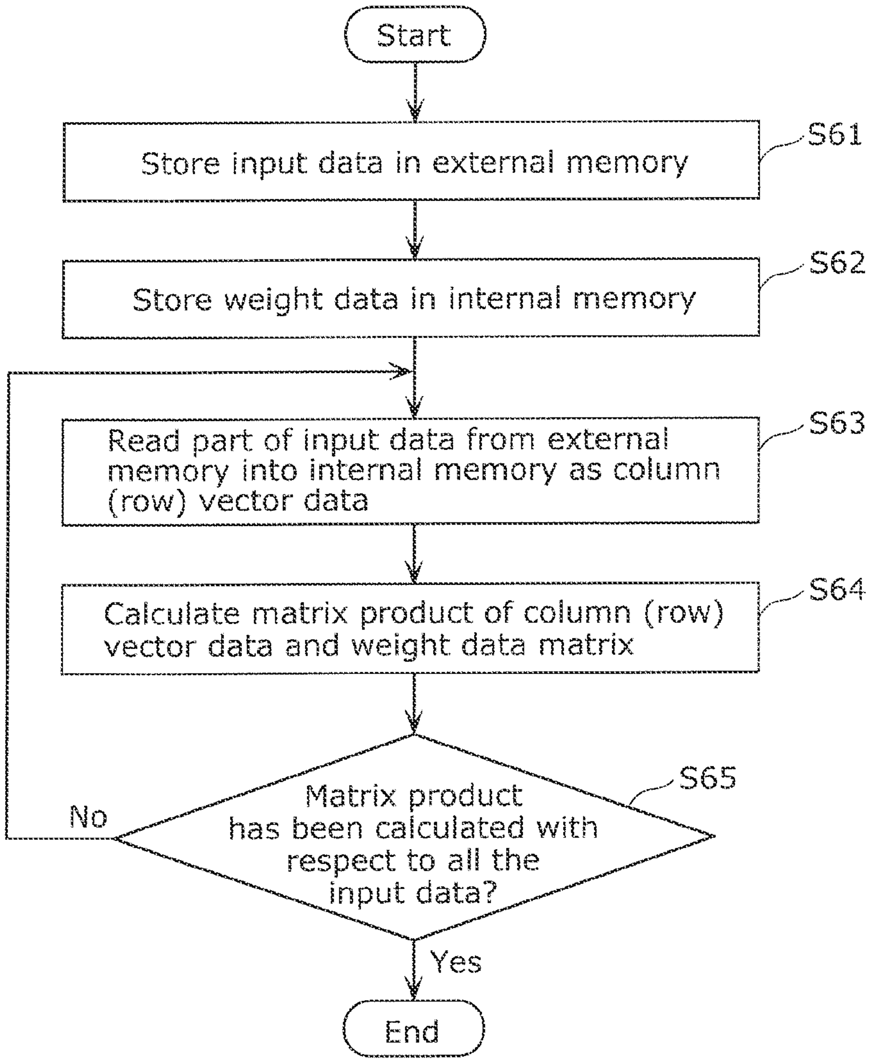
FIG. 7 is a flow chart illustrating details of the operation at step S6 shown in FIG. 5.

FIG. 5 is a flow chart illustrating an outline of the operation of arithmetic system 1 according to the embodiment. FIG. 6 is a flow chart illustrating details of the operation at step S3 shown in FIG. 5. FIG. 7 is a flow chart illustrating details of the operation at step S6 shown in FIG. 5.

Firstly, arithmetic system 1 determines whether the amount of input data is smaller than or equal to the predetermined amount of data (S1). More specifically, arithmetic system 1 determines, for every current convolutional layer to be processed, whether the amount of input data inputted to the current convolutional layer is smaller than or equal to the predetermined amount of data.

When the amount of input data is smaller than or equal to the predetermined amount of data at step S1 (Yes at S1), arithmetic system 1 selects the first arithmetic mode (S2), and performs convolution operation of weight data and input data in the first arithmetic mode (S3). More specifically, when it is determined that the amount of input data is smaller than or equal to the predetermined amount of data at step S1, arithmetic system 1 selects the first arithmetic mode and performs convolution operation in the first arithmetic mode. Here, this will be described in more detail with reference to FIG. 6.

At step S3, as shown in FIG. 6, firstly, arithmetic system 1 stores weight data for a current convolutional layer in external memory 20 (S31). Next, arithmetic system 1 stores input data for the current convolutional layer in internal memory 12 (S32). Next, arithmetic system 1 reads a part of the weight data from external memory 20 into internal memory 12 as row vector data or column vector data (S33). In the present embodiment, arithmetic system 1 reads a part of the weight data from external memory 20 into internal memory 12 as row vector data. Next, arithmetic system 1 calculates the matrix product of (i) the row vector data or the column vector data stored in internal memory 12 and (ii) the input data matrix (S34). In the present embodiment, arithmetic system 1 calculates the matrix product of (i) the row vector data stored in internal memory 12 and (ii) the input data matrix obtained by converting the input data into a matrix form using sampling. Next, arithmetic system 1 determines, with respect to all the weight data stored in external memory 20, whether the matrix product of the input data matrix and the weight data has been calculated (S35). When the matrix product has been calculated with respect to all the weight data at step S35 (Yes at S35), arithmetic system 1 terminates the process of step S3. On the other hand, when the matrix product has not yet been calculated with respect to all the weight data at step S35 (No at S35), the processing of arithmetic system 1 returns to step S33. Then, at step S33, another part of the weight data, which is different from the previously read part of the weight data, is read from external memory 20 into internal memory 12 as row vector data or column vector data, and the process at step S34 is performed.

With reference back to FIG. 5, the operation of arithmetic system 1 is further described below.

On the other hand, when the amount of input data is larger than the predetermined amount of data at step S1 (No at S1), arithmetic system 1 selects the second arithmetic mode (S5), and performs convolution operation of weight data and input data in the second arithmetic mode (S6). More specifically, when it is determined that the amount of input data is larger than the predetermined amount of data at step S1, arithmetic system 1 selects the second arithmetic mode and performs convolution operation in the second arithmetic mode. Here, this will be described in more detail with reference to FIG. 7.

At step S6, as shown in FIG. 7, firstly, arithmetic system 1 stores input data for a current convolutional layer in external memory 20 (S61). Next, arithmetic system 1 stores weight data for the current convolutional layer in internal memory 12 (S62). Next, arithmetic system 1 reads a part of the input data from external memory 20 into internal memory 12 as column vector data or row vector data (S63). In the present embodiment, arithmetic system 1 reads a part of the input data from external memory 20 into internal memory 12 as column vector data. Next, arithmetic system 1 calculates the matrix product of (i) the weight data matrix stored in internal memory 12 and (ii) the column vector data or the row vector data stored in internal memory 12 (S64). In the present embodiment, arithmetic system 1 calculates the matrix product of (i) the weight data matrix stored in internal memory 12 and (ii) the column vector data obtained by converting the stored column vector data using sampling to correspond with the number of elements in a row of the weight data matrix. Next, arithmetic system 1 determines, with respect to all the input data stored in external memory 20, whether the matrix product of the weight data matrix and the input data has been calculated (S65). When the matrix product has been calculated with respect to all the input data at step S65 (Yes at S65), arithmetic system 1 terminates the process of step S6. On the other hand, when the matrix product has not yet been calculated with respect to all the input data at step S65 (No at S65), the processing of arithmetic system 1 returns to step S63. Then, at step S63, another part of the input data, which is different from the previously read part of the input data, is read from external memory 20 into internal memory 12 as column vector data or row vector data, and the process at step S64 is performed.

With reference back to FIG. 5, the operation of arithmetic system 1 is further described below.

When the process at step S3 or step S6 is ended, arithmetic system 1 outputs output data (S7). More specifically, arithmetic system 1 stores the output data, which is a result obtained by performing convolution operation in a current convolutional layer to be processed, in internal memory 12 or external memory 20 as input data for the next layer following the current convolutional layer.

Advantageous Effects, etc.

Figure 8:
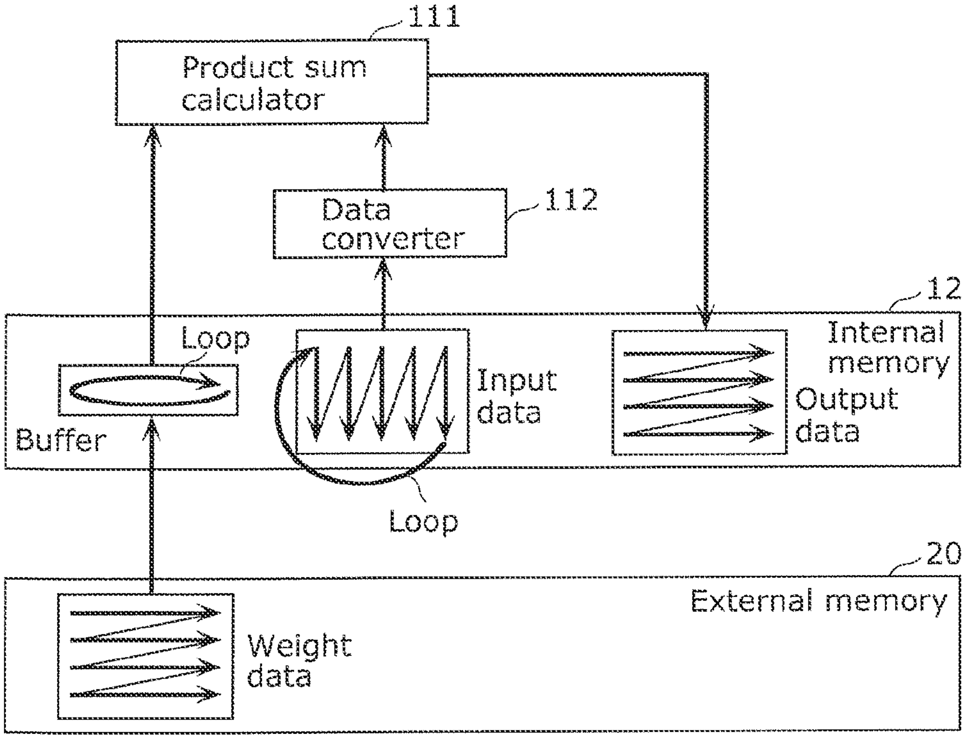
FIG. 8 is a diagram for explaining an effect of an arithmetic method in the first arithmetic mode according to the embodiment.
Figure 9:
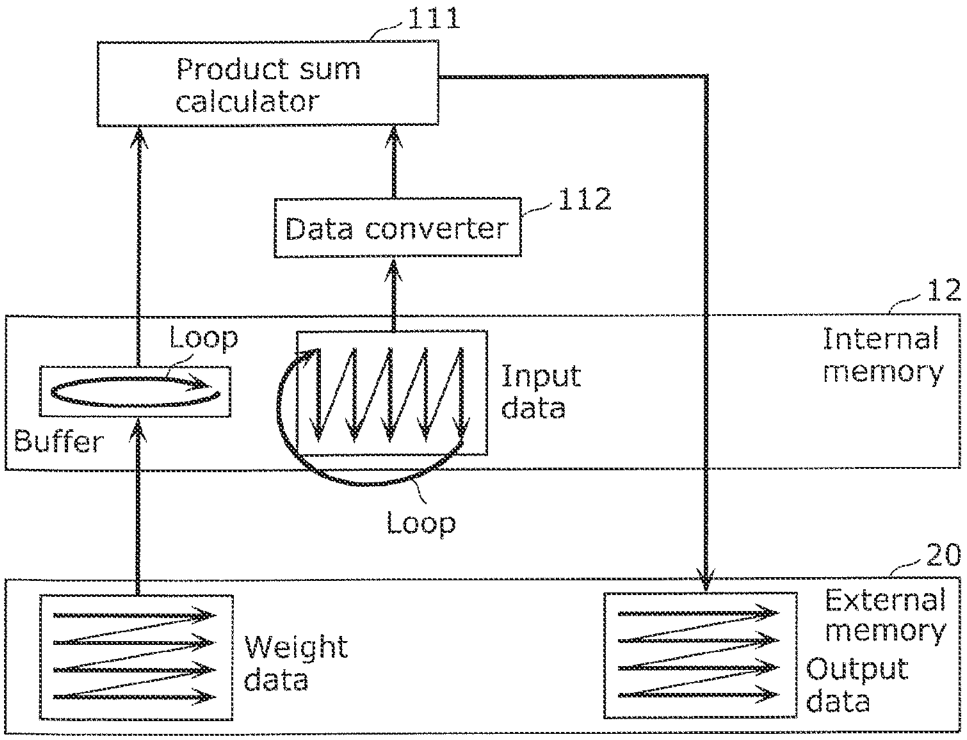
FIG. 9 is a diagram for explaining an effect of the arithmetic method in the first arithmetic mode according to the embodiment.
Figure 10:
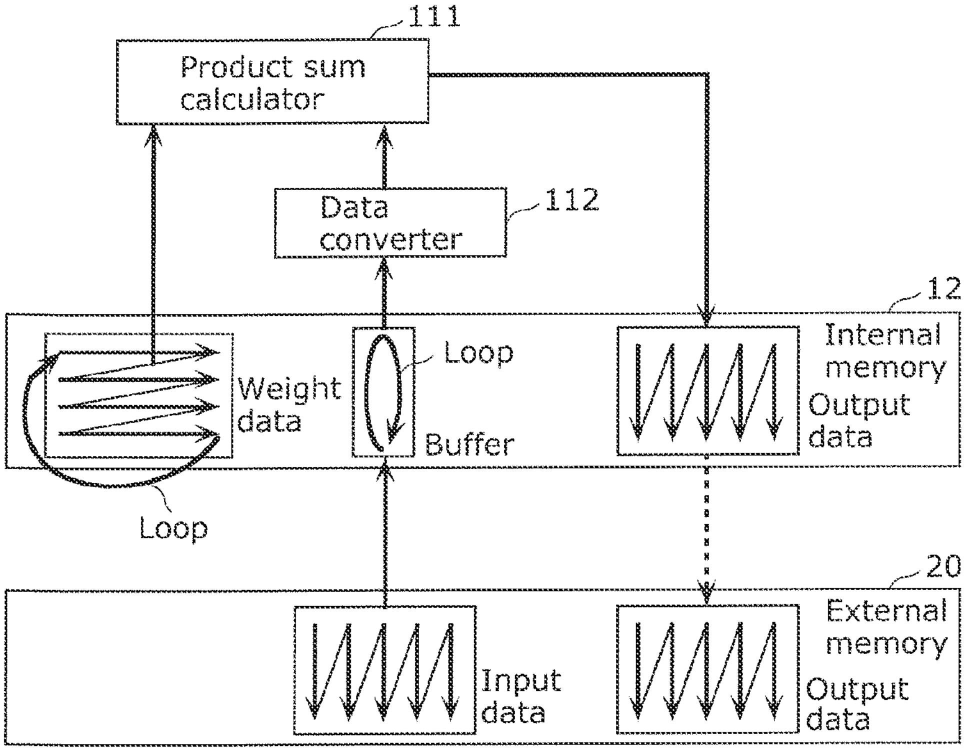
FIG. 10 is a diagram for explaining an effect of the arithmetic method in the second arithmetic mode according to the embodiment.

FIG. 8 and FIG. 9 are each a diagram for explaining an effect of the arithmetic method in the first arithmetic mode according to the embodiment. FIG. 10 is a diagram for explaining an effect of the arithmetic method in the second arithmetic mode according to the embodiment. In FIG. 8 through FIG. 10, substantially identical components are assigned the same reference signs.

In the arithmetic method according to the present embodiment, based on whether the amount of input data for a current convolutional layer to be processed is within or beyond the capacity of internal memory 12, control is switched to reverse an access method for input data and weight data. In other words, in the arithmetic method according to the present embodiment, when the amount of the input data for a current convolutional layer to be processed is within the capacity of internal memory 12, the control is performed to perform convolution operation in the first arithmetic mode. On the other hand, when the amount of the input data for a current convolutional layer to be processed is beyond the capacity of internal memory 12, the control is performed to perform convolution operation in the second arithmetic mode.

Here, as shown in FIG. 8, in the arithmetic method in the first arithmetic mode, the amount of the input data is within the capacity of internal memory 12, and thus all the input data is stored in internal memory 12, and the weight data is stored in external memory 20. This is because all the input data and all the weight data cannot be simultaneously stored in internal memory 12. Then, all the input data is repeatedly read from internal memory 12 and provided to product sum calculator 111. The weight data is partially read from external memory 20 and buffered into a buffer which is a part of internal memory 12, and the buffered weight data is repeatedly provided from this buffer to product sum calculator 111. In this way, all the weight data is read from external memory 20 only once. In other words, the input data stored in internal memory 12 is read and used while looping back many times in the entirety. On the other hand, the weight data stored in external memory 20 is buffered into the buffer of internal memory 12 part by part so that all the weight data is read from external memory 20 only once, and the buffered weight data is used while looping back many times in the buffer, It should be noted that in FIG. 8 and FIG. 9, when all the input data is repeatedly read from internal memory 12, the read input data is converted into a matrix form using sampling and provided to product sum calculator 111. This is due to calculate the matrix product using the weight data partially buffered into the buffer of internal memory 12.

Moreover, in the arithmetic method in the first arithmetic mode shown in FIG. 8, a part of the weight data is buffered into the buffer of internal memory 12 as data of at least one row vector to calculate the matrix product, and thus output data is generated in horizontal direction and stored in internal memory 12. It should be noted that when the amount of the output data is beyond the remaining capacity of internal memory 12, the output data may be outputted to external memory 20 as shown in FIG. 9.

With this, the number of times that the weight data is read from external memory, which increases power consumption, can be minimized, and thus it is possible to perform convolution operation while reducing power consumption even when internal memory 12 has a limited capacity.

As shown in FIG. 10, in the arithmetic method in the second arithmetic mode, the amount of the input data is beyond the capacity of internal memory 12, and thus the input data is stored in external memory 20, and all the weight data is stored in internal memory 12. This is because all the input data and all the weight data cannot be simultaneously stored in internal memory 12. Then, the input data is partially read from external memory 20 and buffered into a buffer which is a part of internal memory 12, and the buffered input data is repeatedly provided from this buffer to product sum calculator 111. All the weight data is repeatedly read from internal memory 12 and provided to product sum calculator 111. In this way, all the input data is read from external memory 20 only once. In other words, the weight data stored in internal memory 12 is read and used while looping back many times in the entirety. On the other hand, the input data stored in external memory 20 is buffered into the buffer of internal memory 12 part by part so that all the input data is read from external memory 20 only once, and the buffered input data is used while looping back many times in the buffer.

Moreover, in the arithmetic method in the second arithmetic mode as shown in FIG. 10, a part of the input data is buffered into the buffer of internal memory 12 as data of at least one column vector to calculate the matrix product, and thus output data is generated in vertical direction and stored in internal memory 12. It should be noted that when the amount of the output data is beyond the remaining capacity of internal memory 12, the output data may be outputted to external memory 20.

With this, the number of times that the input data is read from external memory, which increases power consumption, can be minimized, and thus it is possible to perform convolution operation while reducing power consumption even when internal memory 12 has a limited capacity.

In this way, convolution operation can be performed using internal memory 12 having a limited capacity without restricting the size of input data and output data, and thus it is possible to reduce the cost in comparison with the case where large-capacity internal memory 12 is mounted.

As described above, with the arithmetic method according to the present embodiment, it is possible to perform convolution operation while reducing power consumption even when internal memory has a limited capacity of a few M bytes or less, for example (Variation)

In the foregoing embodiment, when the amount of input data is beyond the capacity of internal memory 12, the input data is stored in external memory 20, and all the weight data is stored in internal memory 12. However, the present disclosure is not limited to this. All the weight data may be not able to be stored depending on the capacity (size) of internal memory 12. In the following variation, the duplicated description is omitted, and the description focuses on differences from the foregoing embodiment.

In arithmetic system 1 according to the present variation, it is assumed that in the second arithmetic mode, all the weight data cannot be stored in internal memory 12 in comparison with arithmetic system 1 according to the foregoing embodiment. Accordingly, the details of the operation of controller 40 in the second arithmetic mode are different from those of arithmetic system 1. The others are the same as those in the foregoing embodiment.

[Controller 40]

Similar to the foregoing embodiment, when determiner 30 determines that the amount of input data is larger than the predetermined amount of data, controller 40 according to the present variation selects the second arithmetic mode and performs convolution operation in the second arithmetic mode.

More specifically, firstly, when the second arithmetic mode is selected, controller 40 stores input data and weight data for a current convolutional layer in external memory 20 located outside circuit 10.

Next, controller 40 stores a part of the weight data from external memory 20 into internal memory 12 as the first vector data which is data of at least one row vector or column vector. Then, controller 40 reads the input data from external memory 20 Into internal memory 12 part by part as data of at least one column vector or row vector, and causes product sum calculator 111 to calculate the matrix product of the data of at least one column vector or row vector and the first vector data stored in internal memory 12.

Next, controller 40 stores another part of the weight data, which is different from the previously read part of the weight data, from external memory 20 into internal memory 12 as the second vector data which is data of at least one row vector or column vector. Subsequently, controller 40 reads the input data from external memory 20 into internal memory 12 part by part as data of at least one column vector or row vector, and causes product sum calculator 111 to calculate the matrix product of the data of at least one column vector or row vector and the second vector data stored in internal memory 12.

It should be noted that the present disclosure is not limited to the case where all the weight data is stored in external memory 20. A part of weight data may be stored in internal memory 12, and the remaining part of weight data may be stored in external memory 20. In this case, the size (capacity) of the part of weight data may be the maximum available size of internal memory 12.

With this, controller 40 can read the weight data, as a whole, from external memory 20 into internal memory 12 only once to calculate the matrix product with respect to all the weight data as described above.

[Operation of Arithmetic System 1]

The operation of arithmetic system 1 according to the variation as described above will be described. An outline of the operation of arithmetic system 1 according to the variation is the same as in FIG. 5, and thus the description is omitted.

In arithmetic system 1 according to the present variation, the details at step S6 in FIG. 5 are different from those of arithmetic system 1 according to the foregoing embodiment. The following describes step S6 according to the present variation with reference to FIG. 11.

Figure 11:
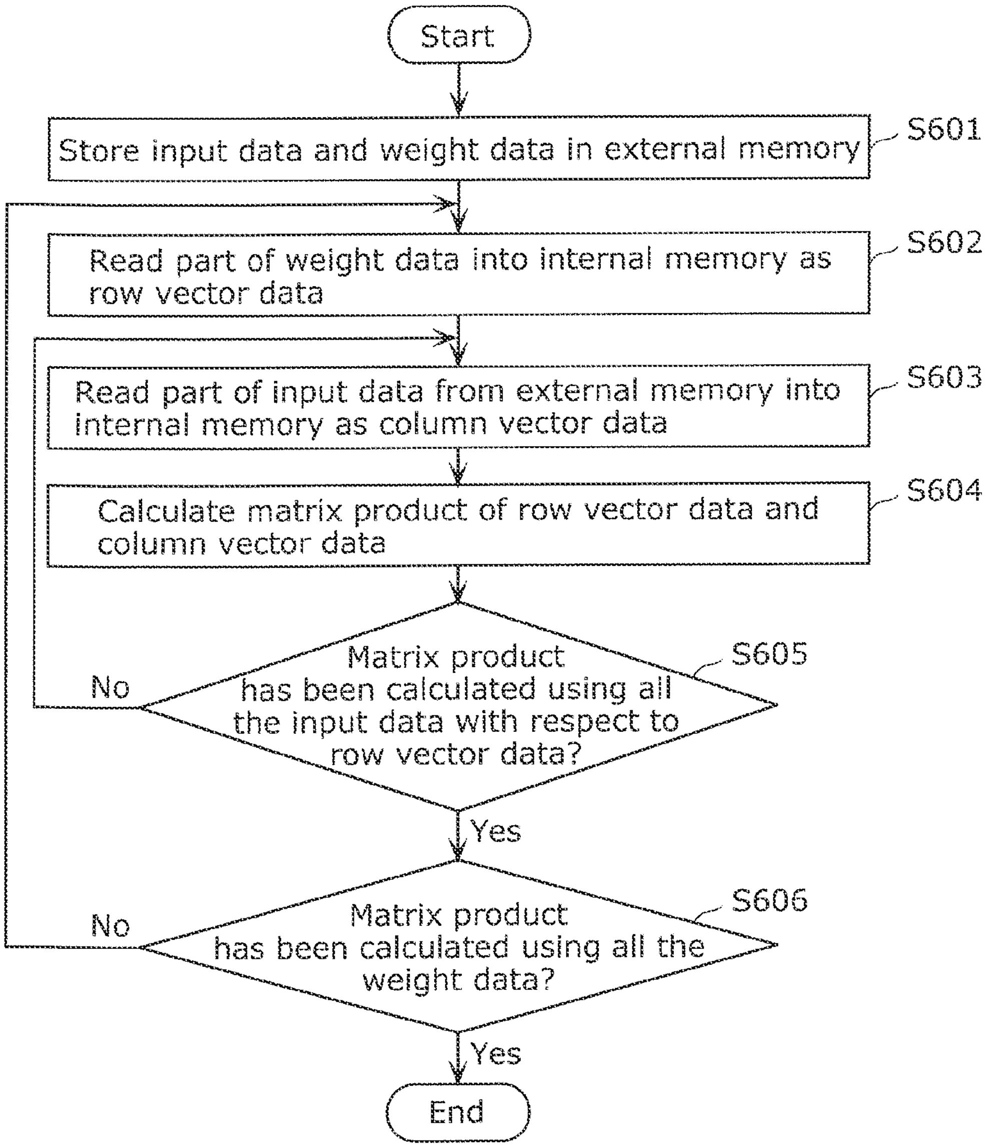
FIG. 11 is a flow chart illustrating details of the operation at step S6 according to a variation.

FIG. 11 is a flow chart illustrating details of the operation at step S6 according to the variation.

At step S6, as shown in FIG. 11, firstly, arithmetic system 1 according to the present variation stores input data and weight data for a current convolutional layer to be processed, in external memory 20 (S601).

Next, arithmetic system 1 according to the present variation reads a part of the weight data from external memory 20 into internal memory 12 as data of at least one row vector (S602).

Next, arithmetic system 1 according to the present variation reads a part of the input data from external memory 20 into internal memory 12 as data of at least one column vector (S603).

Next, arithmetic system 1 according to the present variation calculates the matrix product of (i) the row vector data which is the part of weight data read into internal memory 12 and (ii) the column vector data which is the part of input data read into internal memory 12 (S604). In the present variation, arithmetic system 1 calculates the matrix product of (i) the row vector data read into internal memory 12 and (ii) the column vector data obtained by converting the read column vector data using sampling to correspond with the number of elements in the row vector data.

Next, arithmetic system 1 according to the present variation determines, with respect to the row vector data which is the part of weight data read into internal memory 12, whether the matrix product has been calculated using all the input data stored in external memory 20 (S605).

When the matrix product has not yet been calculated at step S605 (No at S605), the processing returns to step S603, and arithmetic system 1 according to the present variation reads another part of the input data, which is different from the previously read part of the input data, from external memory 20 into internal memory 12 as data of at least one column vector. Then, the process at step S604 is performed.

On the other hand, when the matrix product has been calculated at step S605 (Yes at S605), arithmetic system 1 according to the present variation determines whether the matrix product has been calculated using all the weight data stored in external memory 20 (S606).

When the matrix product has not yet been calculated at step S606 (No at S606), the processing returns to steps S602, and arithmetic system 1 according to the present variation reads another part of the weight data, which is different from the previously read part of the weight data, from external memory 20 into internal memory 12 as data of at least one row vector. Then, the process at step S603 and processes following it are performed.

On the other hand, when the matrix product has been calculated at step S606 (Yes at S606), arithmetic system 1 according to the present variation terminates the process of step S6.

In this way, arithmetic system 1 according to the present variation reads the weight data, as a whole, from external memory 20 into internal memory 12 only once to perform convolution operation in the second arithmetic mode.

It should be noted that the process in which the weight data is read, as a whole, into internal memory 12 only once to perform convolution operation in the second arithmetic mode has been described with reference to FIG. 11, but the present disclosure is not limited to this. The input data may be read, as a whole, from external memory 20 into internal memory 12 only once to perform convolution operation in the second arithmetic mode. In this case, a part of the input data may be read as row vector data at step S602, and a part of the weight data may be read as column vector data at step S603, Then, it is determined whether the matrix product has been calculated using all the weight data with respect to the row vector data at step S605, and it is determined whether the matrix product has been calculated with respect to all the input data at step S606.

Advantageous Effects, etc.

Figure 12:
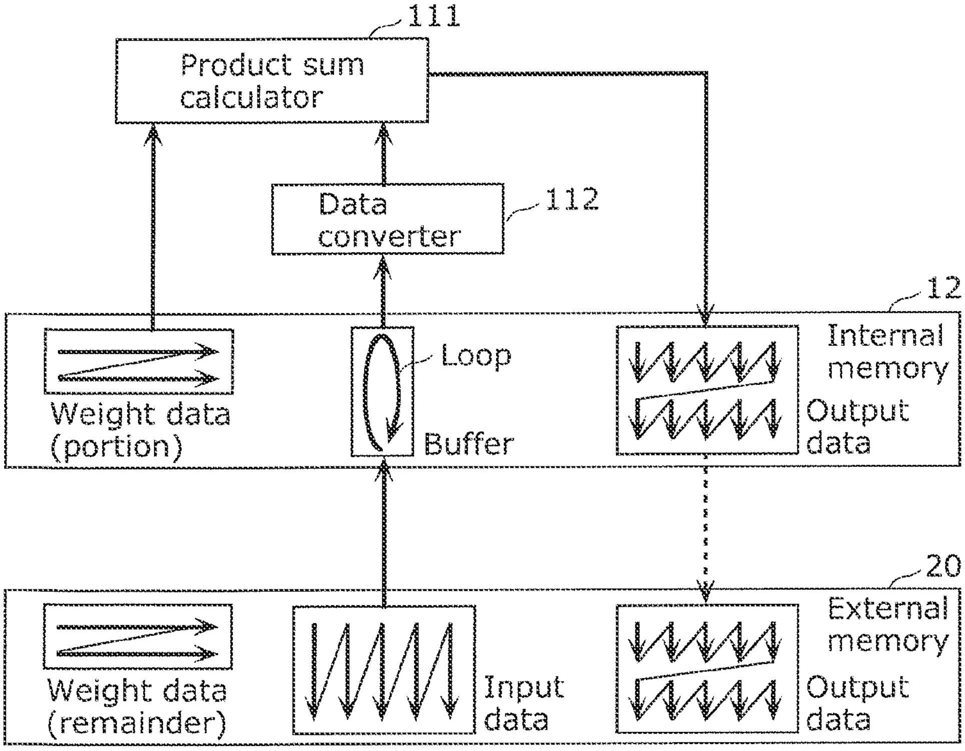
FIG. 12 is a diagram for explaining an effect of the arithmetic method in the second arithmetic mode according to the variation.

FIG. 12 is a diagram for explaining an effect of the arithmetic method in the second arithmetic mode according to the variation. Components substantially identical to those in FIG. 10 are assigned the same reference signs.

As shown in FIG. 12, in the arithmetic method in the second arithmetic mode, the amount of the input data is beyond the capacity of internal memory 12, and thus the input data is stored in external memory 20. In the present variation, all the weight data also cannot be stored in internal memory 12, and thus a part of the weight data is stored in internal memory 12 and the remaining part of the weight data is stored in external memory 20. For this reason, the input data is partially read from external memory 20 and buffered into a buffer which is a part of internal memory 12, and the buffered input data is repeatedly provided from this buffer to product sum calculator 111. Similarly, a part of the weight data is repeatedly read from internal memory 12 and provided to product sum calculator 111. In this way, all the input data or all the weight data can be read from external memory 20 only once.

For example, the weight data stored across internal memory 12 and external memory 20 may be read and used while looping back many times in the entirety. In this case, the input data stored in external memory 20 is buffered into the buffer of internal memory 12 part by part so that all the input data is read from external memory 20 only once, and the buffered input data is used while looping back many times in the buffer.

Moreover, for example, as described above, the input data stored across internal memory 12 and external memory 20 may be read and used while looping back many times in the entirety. In this case, the weight data stored in external memory 20 is buffered into the buffer of internal memory 12 part by part so that all the weight data is read from external memory 20 only once, and the buffered weight data is used while looping back many times in the buffer.

In the arithmetic method in the second arithmetic mode as shown in FIG. 12, a part of the input data is buffered into the buffer of internal memory 12 as data of at least one column vector to calculate the matrix product, and thus output data is generated in vertical direction and stored in internal memory 12. It should be noted that when the amount of the output data is beyond the remaining capacity of internal memory 12, the output data may be outputted to external memory 20.

With this, the number of times that the input data or the weight data is read from external memory, which increases power consumption, can be minimized, and thus it is possible to perform convolution operation while reducing power consumption even when internal memory 12 has a limited capacity.

Other Embodiments, etc.

The arithmetic method according to one or more aspects of the present disclosure have been described above on the basis of the embodiment and so forth, but the present disclosure is not limited to the embodiment. For example, an embodiment achieved by freely combining structural components described in the present specification or an embodiment achieved by eliminating one or more of the structural components described in the present specification may serve as an embodiment of the present disclosure. Furthermore, the present disclosure also includes a variation achieved by making various modifications and alternations to the above embodiment that can be conceived by those skilled in the art without departing from the essence of the present disclosure, i.e., the meaning of the language recited in Claims.

The scope of one or more aspects of the present disclosure may also include:

(1) One or more of the structural components included in the arithmetic system described above may be implemented as a computer system that includes a microprocessor, a ROM, a RAM, a hard disk unit, a display unit, a keyboard, a mouse, and so forth. The RAM or the hard disk unit stores a computer program. The microprocessor's operating in accordance with the computer program enables its function. Here, the computer program is a collection of command codes that indicate instructions to the computer for achieving a predetermined function;

(2) One or more of the structural components included in the arithmetic system described above may be implemented as a single system large scale integration (LSI). A system LSI is a super-multifunctional LSI fabricated by integrating a plurality of structural components on a single chip. The system LSI is more specifically a computer system that includes a microprocessor, a ROM, a RAM, and so forth. The RAM stores a computer program. The microprocessor's operating in accordance with the computer program enables the system LSI to achieve its function;

(3) One or more of the structural components included in the arithmetic system described above may be implemented as an integrated circuit (IC) card or a single module removable from each device. The IC card or the module is a computer system that includes a microprocessor, a ROM, a RAM and so forth. The IC card or the module may include the super-multifunctional LSI described above. The microprocessor's operating in accordance with a computer program enables the IC card or the module to achieve its function. Such IC card or module may be tamper resistant;

(4) One or more of the structural components included in the arithmetic system described above may be implemented as the computer program or digital signals recorded on a computer-readable recording medium such as a flexible disk, a hard disk, a CD-ROM, an MO, a DVD, a DVD-ROM, a DVD-RAM, a Blu-ray® disc (BD), and a semiconductor memory. One or more of the structural components included in the arithmetic system described above may also be digital signals recorded in such recording medium;

One or more of the structural components included in the arithmetic system described above may transmit the computer program or the digital signals via, for example, a telecommunication line, a wireless or wired communication line, a network represented by the Internet, and data broadcasting;

(5) The present disclosure may also be the above-described method. The present disclosure may also be a computer program that enables such method to be implemented by a computer, or digital signals that form the computer program;

(6) The present disclosure may also be a computer system that includes a microprocessor and a memory, in which the memory may store the computer program and the microprocessor may operate in accordance with the computer program;

(7) The present disclosure may also be achieved by transmitting the program or the digital signals recorded on the recording medium or by transmitting the program or the digital signals via, for example, the network, thereby enabling another independent computer system to carry out the present disclosure; and (8) The above embodiment and the above variation may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an arithmetic method, particularly to an arithmetic method for use as a method and a circuit technology for performing low-power-consumption convolution operation in a convolutional layer of a large convolutional neural network for image recognition.

The invention claimed is:

1. An arithmetic method of performing convolution operations in convolutional layers of a neural network by calculating matrix products, using an arithmetic unit and an internal memory included in a large scale integration (LSI), the arithmetic method comprising, for each convolution layer of the convolution layers:

- receiving input data of the convolution layer;
- determining whether an amount of the input data is smaller than or equal to a predetermined amount of data;
- selecting a first arithmetic mode and performing convolution operations in the first arithmetic mode, when the amount of the input data is determined to be smaller than or equal to the predetermined amount of data in the determining;
- selecting a second arithmetic mode and performing convolution operations in the second arithmetic mode, when the amount of the input data is determined to be larger than the predetermined amount of data in the determining; and
- outputting output data which is a result obtained by performing convolution operations in either the first arithmetic mode or the second arithmetic mode, wherein:
- the performing of convolution operations in the first arithmetic mode includes:
  - storing weight data for the convolutional layer in external memory located outside the LSI;
  - storing the input data in the internal memory; and
  - reading the weight data from the external memory into the internal memory part by part as first data of at least one row vector or column vector, and causing the arithmetic unit to calculate a matrix product of the first data and a matrix of the input data stored in the internal memory,
- the weight data is read, as a whole, from the external memory into the internal memory only once,
- the performing of convolution operations in the second arithmetic mode includes:
  - storing the input data in the external memory located outside the LSI;
  - storing a matrix of the weight data for the convolutional layer in the internal memory; and
  - reading the input data from the external memory into the internal memory part by part as second data of at least one column vector or row vector, and causing the arithmetic unit to calculate a matrix product of the second data and the matrix of the weight data stored in the internal memory, and
- the input data is read, as a whole, from the external memory into the internal memory only once.

2. The arithmetic method according to claim 1, wherein in the outputting, the output data is outputted by storing the output data in the internal memory or the external memory as input data for a next layer following the convolutional layer.

3. The arithmetic method according to claim 2, wherein the next layer is another convolutional layer, a pooling layer, or a normalize layer in the neural network.

4. The arithmetic method according to claim 1, wherein the performing of convolution operations in the first arithmetic mode includes:

converting the input data stored in the internal memory into the matrix of the input data using sampling, and the performing of convolution operations in the second arithmetic mode includes:

converting the input data partially read into the internal memory into data of at least one column vector or row vector using sampling.

5. The arithmetic method according to claim 1, wherein in the performing of convolution operations in the second arithmetic mode, the input data is stored in the external memory in tile form.

6. The arithmetic method according to claim 1, wherein in the outputting, when the output data is stored in the external memory, the output data is stored in the external memory in tile form.

7. An arithmetic method of performing convolution operations in convolutional layers of a neural network by calculating matrix products, using an arithmetic unit and an internal memory included in a large scale integration (LSI), the arithmetic method comprising, for each convolution layer of the convolution layers:

receiving input data for the convolution layer;

determining whether an amount of the input data is smaller than or equal to a predetermined amount of data;

selecting a first arithmetic mode and performing convolution operations in the first arithmetic mode, when the amount of the input data is determined to be smaller than or equal to the predetermined amount of data in the determining;

selecting a second arithmetic mode and performing convolution operations in the second arithmetic mode, when the amount of the input data is determined to be larger than the predetermined amount of data in the determining; and outputting output data which is a result obtained by performing convolution operations in either the first arithmetic mode or the second arithmetic mode, wherein the performing of convolution operations in the first arithmetic mode includes:

storing weight data for the convolutional layer in external memory located outside the LSI;

storing the input data for the convolutional layer in the internal memory; and reading the weight data from the external memory into the internal memory part by part as first data of at least one row vector or column vector, and causing the arithmetic unit to calculate a matrix product of the first data and a matrix of the input data stored in the internal memory, the weight data is read, as a whole, from the external memory into the internal memory only once, the performing of convolution operations in the second arithmetic mode includes:

storing the input data and the weight data for the convolutional layer in the external memory located outside the LSI;

storing a part of the weight data from the external memory to the internal memory as first vector data which is data of at least one row vector or column vector;

reading the input data from the external memory into the internal memory part by part as second data of at least one column vector or row vector, and causing the arithmetic unit to calculate a matrix product of the second data and the first vector data stored in the internal memory;

storing another part of the weight data from the external memory to the internal memory as second vector data which is data of at least one row vector or column vector, the another part of the weight data being different from the part of the weight data; and reading the input data from the external memory into the internal memory part by part as third data of at least one column vector or row vector, and causing the arithmetic unit to calculate a matrix product of the third data and the second vector data stored in the internal memory, and the weight data is read, as a whole, from the external memory into the internal memory only once.

* * * * *